March 18, 1941.  W. MÖBIUS  2,235,079

TURNING LATHE

Filed Aug. 10, 1939  2 Sheets-Sheet 1

Inventor
WALTER MÖBIUS.
By
Attorney

March 18, 1941.  W. MÖBIUS  2,235,079
TURNING LATHE
Filed Aug. 10, 1939  2 Sheets-Sheet 2

Inventor
WALTER MÖBIUS.
By
Attorney

Patented Mar. 18, 1941

2,235,079

UNITED STATES PATENT OFFICE 2,235,079

TURNING LATHE

Walter Möbius, Magdeburg-Neustadt, Germany, assignor to Magdeburger Werkzeugmaschinenfabrik G. m. b. H., Magdeburg-Neustadt, Germany Application August 10, 1939, Serial No. 289,361
In Germany November 14, 1936

11 Claims. (Cl. 82—32)

This invention relates to improvements in turning lathes and has particular reference to turning lathe beds of the type comprising a tubular bed body.

It is an object of the present invention to provide a tubular bed construction in which the torsional stress exerted on the tubular bed due to the working pressure of the tool is small.

Another object of the invention is to facilitate the removal of the chips.

With these and further objects in view, as may become apparent from the within disclosures, the invention consists not only in the structures herein pointed out and illustrated by the drawings, but includes further structures coming within the scope of what hereinafter may be claimed.

The character of the invention, however, may be best understood by reference to certain of its structural forms, as illustrated by the accompanying drawings in which—

Similar reference numerals denote similar parts in the different views.

As here shown, the guide rails for the slide are welded directly to the tubular body of the bed of the turning lathe and the guide rail or rails on the rear side are arranged approximately at the level of a plane passing through the axis of the tube, while the guide rail on the front or operator's side is arranged at a higher level.

Figure 1:
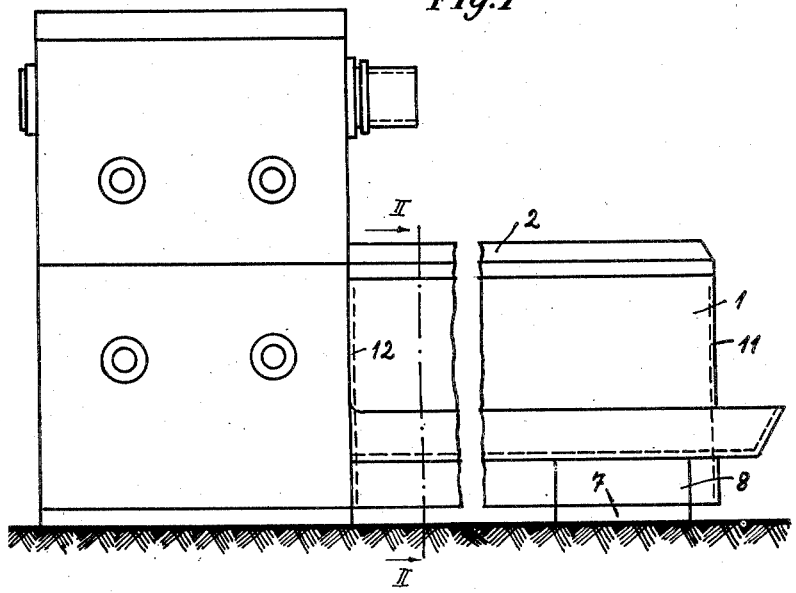
Fig. 1 is a fragmentary side view of a turning lathe having the invention applied thereto.
Figure 2:
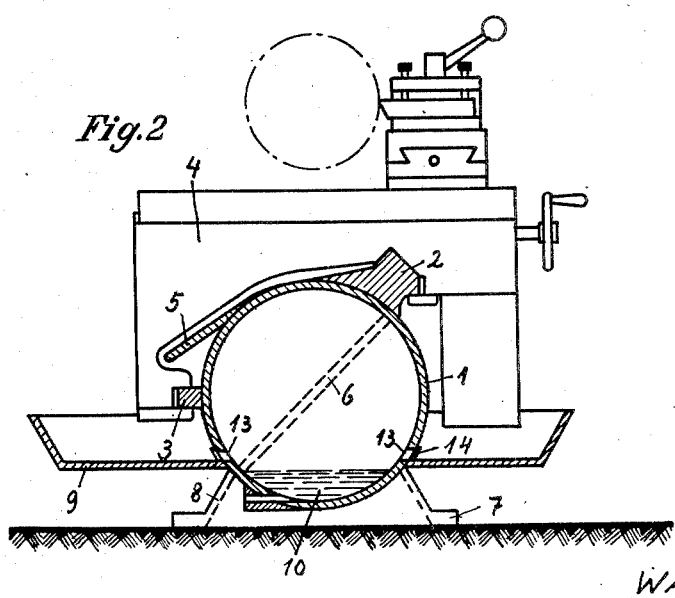
Fig. 2 is a section on line II—II of Fig. 1.
Figure 3:
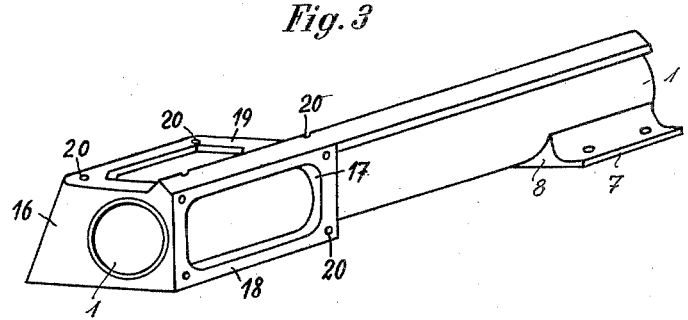
Fig. 3 is a perspective view of the bed including the substructure for the head stock.

Referring now to the drawings in greater detail, and first to Figs. 1, 2 and 3, it will be seen that the bed body consists of a tubular body 1, preferably made of commercial steel tube material. The guide rails 2 and 3 for the slide 4 are welded directly to the tube 1. The guide rail 2 on the operator's side of the lathe is arranged at a higher level than the guide rail 3 on the rear side which as shown is positioned approximately at the level of a horizontal plane passing through the axis of the tube 1. The lower guide rail 3 is covered against chips by an inclined metal sheet 5 welded to the tube 1. The upper guide rail 2 has advantageously a prismatic cross section and engages the tube over a larger surface, since it has to take up the bulk of the pressure on the guide rails. The transition from the prism of the guide rail 2 to the tube is obliquely formed so that the guide rail together with a part of the tube and the cover sheet 5 forms an inclined face for permitting the chips to glide down.

If required, the tube may be reinforced or stiffened by one or more longitudinal walls in the form of chords in the tube, as indicated in Fig. 2 at 6 in dotted lines. The said walls may be welded to the points of the tube wall where the guide rails 2 and/or 3 are connected to the outside of the wall.

The bed body 1 rests on legs or feet 7 arranged directly underneath the bed body and connected thereto by means of supporting sheets 8, by welding. With a bed body of a large turning diameter it is advantageous to weld the chip receiving trough 9 to the tube 1 also. The portion of the interior of the tube lying underneath the bottom of the chip receiving trough serves as a container for cooling water 10. The end of the tube on the sliding puppet or tailstock side of the lathe is closed by means of a welded-in wall 11. Moreover, a partition wall 12 is welded in the tube at the opposite end where the bed is connected to the head stock. Passages or perforations 13 in the tube wall near the bottom of the chip receiving trough 9 serve for admitting the cooling water from the chip trough to the interior of the tube and are covered by sieves 14.

Referring more particularly to Fig. 3, it will be noted that a head stock substructure in the form of a frame 16, 17, 18, 19 welded of steel sheets is welded to the bed body 1 in order to effect a reliable connection between the bed body and the head stock. The side walls 16 and 17 of the said frame lying transverse to the tube axis are cut out to fit the circular cross section of the bed body 1 and the edges of the cut portions are welded to the bed body or tube 1. The face 18 of the frame serves for fixing the feed gear box (not shown) while the head stock is mounted on the top face 19 of frame. The walls 18 and 19 of the frame are apertured to form windows and bores 20 serve for screwing the head stock and the feed gear box to the frame.

Figure 4:
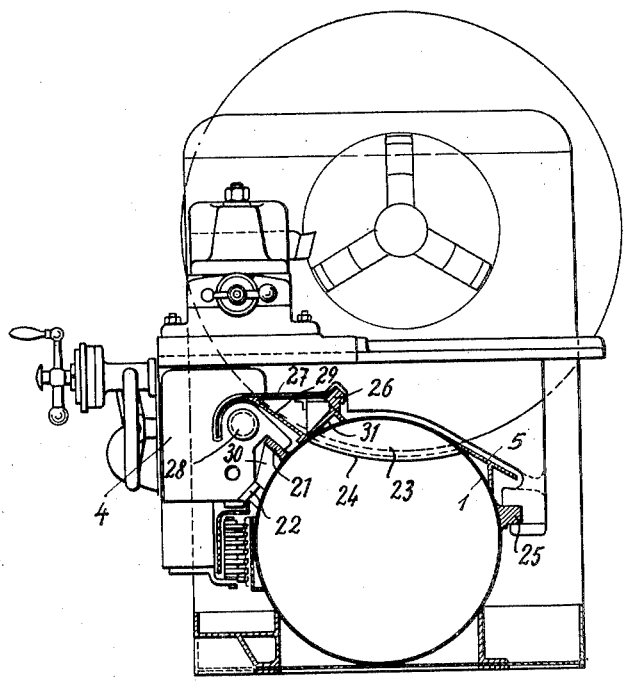
Fig. 4 is a cross sectional view similar to Fig. 2, but showing a modification having two parallel guide rails on the front or operator's side for the slide of the lathe.

Referring now to the modification shown in Fig. 4, the prismatic guide rail for the bed slide positioned on the front side and at the higher level is divided to form two parallel guide rails 21 and 22, the guide rail 22 being secured to the tube wall underneath the rail 21. The guide face of the upper guide rail 21 lies in a plane which is radial to the tube while the guide face of the lower guide rail 22 is provided at right angles to the guide face of the upper guide rail 21.

In order to increase the turning diameter, i. e., the admissible maximum diameter of the work pieces that can be turned on the lathe, the tube 1 is provided with an incision at 23, near the head stock, for the face plate, and the incision is closed by a wall 24. The guide rails 21 and 22 on the front side and the guide rail 25 on the rear are positioned at a lower level than the bottom of the incision 23 to form a through-going guide for the slide and to permit the slide to be moved to the head stock.

A further prismatic guide rail 26 is provided at the tube above the guide rails 21 and 22, to form the upper guide for the tailstock. Moreover, a horizontal metal sheet 27 on the guide 26 extends over the feed spindle 28 and is downwardly bent at its free end, thus covering also the guide rails 21 and 22. The slide 4 is recessed for the sheet 27.

The prismatic guide rail 26 for the tailstock is interrupted at the incision 23 and the respective portions of the cover plate 27 are secured directly to the bed body adjacent to the incision 23, thus forming an extension 29 of the trough-shaped cover or closure wall 24 for the incision 23.

The guide rails 21 and 22 are supported by ribs 30 formed of metal sheets or plates, while the upper guide rail 26 for the tailstock is welded to the bed by intermediation of an angle iron 31.

It will thus be seen from the foregoing that my novel turning lathe offers considerable advantages. The distance from the upper guide rail for the slide rest to the point of attack of the tool can be made small so that the leverage of the forces acting upon the tool is small. Also, the distance from the axis of the tubular body to the axis of the spindle becomes small and, as a result, the lever arm of the forces causing a torsional stress of the lathe is reduced. Moreover, it is easily possible to remove the chips over the lower guide rail.

The provision of two parallel guide rails for the slide rest on the front side making up together the front side guide rail means offers the advantage that a relatively wide strip of the wall of the tube receives the upper guide rail which carries the bulk of the load. Moreover, it is thus possible to arrange the feed spindle close to the bed body. Also, due to the provision of two parallel front side guide rails the two prismatic faces of the said guide rails can be arranged very close to the wall of the tube.

Where the tubular body consists of sheet material, the above described guide rails in the form of section iron or with a substructure of section iron have an additional stiffening effect with respect to the tube.

I claim:

1. The combination, in a turning lathe, of a steel tube body forming the bed of the lathe, with guide means for the slide of the lathe welded directly to predetermined points of said body, said guide means comprising a guide rail disposed at the rear side of the lathe and positioned approximately at a level lying in the horizontal plane passing through the axis of said body, and a front side guide rail disposed at a level higher than that of said rear side guide rail.

2. The combination, in a turning lathe, of a tubular steel body forming the bed of the lathe, with gide means for the slide of the lathe welded directly to said body, said guide means comprising a guide rail disposed at the rear side of the lathe and positioned approximately at a level lying in the horizontal plane passing through the longitudinal axis of said body, and a front side guide rail at a level higher than that of said rear side guide rail, and stiffening means within said tubular body and extending transversely therein.

3. The combination, in a turning lathe, of a tubular body forming the bed of the lathe, with guide means for the slide of the lathe welded directly to the tubular body and at respective predetermined locations thereof, said guide means comprising a guide rail at the rear side of the lathe positioned approximately at a level lying in the horizontal plane passing through the axis of said tubular body, and a front side guide rail at a level higher than that of said rear side guide rail, and stiffening means crosswise extending from at least one of said guide rails within said tubular body.

4. In a turning lathe, in combination, a tubular body forming the bed of the lathe, guide rails for the slide of the lathe welded directly to the tubular body and comprising a guide rail on the rear side of the lathe positioned approximately at the level of a horizontal plane passing through the axis of the tube and a front side guide rail at a higher level, a chip receiving trough welded to the tube body and communicating with the interior of the tube which is provided as a container for the cooling agent, through perforations in the tube walls, and sieves covering said perforations.

5. In a turning lathe, in combination, a head stock including a mounting frame therefor, a tubular body forming the bed of the lathe and extending through cut out portions in the end walls of said mounting frame for connection to said frame, and guide rails for the slide of the lathe welded directly to the tubular body and comprising a guide rail on the rear side of the lathe positioned approximately at the level of a horizontal plane passing through the axis of the tube and a front side guide rail at a higher level.

6. In a turning lathe, in combination, a tubular body forming the bed of the lathe, and guide rails for the slide of the lathe welded directly to the tubular body and comprising a guide rail on the rear side of the lathe positioned approximately at the level of a horizontal plane passing through the axis of the tube, an inclined sheet welded tangentially to the tube body for covering said rear side guide rail against chips, and a front side guide rail at a higher level.

7. In a turning lathe, in combination, a tubular body forming the bed of the lathe, and guide rails for the slide of the lathe welded directly to the tubular body and comprising a guide rail on the rear side of the lathe positioned approximately at the level of a horizontal plane passing through the axis of the tube, a front side guide rail at a higher level, and a chip removing face arranged between the top of said tubular body and said front side guide rail.

8. The combination, in a turning lathe, of a commercial steel tube forming the bed of the lathe, with guide means for the slide of the lathe welded directly to said tube, said guide means comprising a guide rail at the rear side of the lathe and positioned approximately at a level in the horizontal plane passing through the axis of said tube, and two front side guide rails parallelly arranged with respect to each other and at levels higher than that of said rear side guide rail.

9. In a turning lathe, in combination, a tubular body forming the bed of the lathe and provided with an incision for the face plate of the lathe, and guide rails for the slide of the lathe welded directly to the tubular body and comprising a guide rail on the rear side of the lathe positioned approximately at the level of a horizontal plane passing through the axis of the tube and a front side guide rail at a higher level, but below the bottom point of said incision.

10. In a turning lathe, in combination, a tubular body forming the bed of the lathe, and guide rails for the slide of the lathe welded directly to the tubular body and comprising a guide rail on the rear side of the lathe positioned approximately at the level of a horizontal plane passing through the axis of the tube and a front side guide rail at a higher level, a further guide rail for the tailstock of the lathe welded to the tube above said front side guide rail, and a cover plate on said tailstock guide rail extending over the feed spindle and the front side guide rails.

11. In a turning lathe, in combination, a tubular body forming the bed of the lathe and provided with an incision for the face plate of the lathe and a closure wall for said incision, and guide rails for the slide of the lathe welded directly to the tubular body and comprising a guide rail on the rear side of the lathe positioned approximately at the level of a horizontal plane passing through the axis of the tube and a front side guide rail at a higher level, but below the bottom point of said incision, a further guide rail for the tailstock of the lathe welded to the tube above said front side guide rail, and a cover plate on said tailstock guide rail extending over the feed spindle and the front side guide rails, said cover plate being interrupted at said incision and secured directly to the bed body in the form of a continuation of said closure wall.

WALTER MÖBIUS.